United States Patent Office 2,904,522
Patented Sept. 15, 1959

2,904,522
PROCESS FOR THE PREPARATION OF AN EXPANDED PLASTISOL COMPOSITION

Willard E. Catlin, Woodstown, and Mack F. Fuller, Woodbury, N.J., assignors to E. I. du Pont de Nemours and Company, Wilmington, Del., a corporation of Delaware No Drawing. Application May 24, 1954
Serial No. 432,055

8 Claims. (Cl. 260—2.5)

This invention relates to the manufacture of cellular plastic material and in particular to an improved process for such manufacture, and the products of such process.

In U.S. patent application 343,265, filed March 18, 1953, and having a common assignee with the instant application, there is disclosed a novel process for the preparation of cellular polyvinyl chloride with a chemical blowing agent. This novel process differs generally from prior art processes in that it involves heating a plastisol composition at atmospheric pressure and at temperatures which permit decomposition of the blowing agent and consequent foaming of the composition before gelation of the plastisol occurs. The composition is then heated further to flux the resin with the plasticizer. Such a process obviates the need for expensive high-pressure equipment hitherto required for obtaining materials having low densities and thick sections. In addition, this process permits much wider choice of compounding ingredients than do processes of the prior art.

We now have found that we can greatly improve the product obtained with this atmospheric pressure foaming process by the addition of certain hydrocarbon oil-soluble additives to the plastisol before heating. The surface-active materials which we have found most effective are the alkali metal and alkaline earth metal salts of sulfonic acids. We prefer to use the alkaline earth metal salts of the alkaryl sulfonic acids. Especially preferred are the alkaline earth metal salts of alkaryl monosulfonic acids. Mixtures, containing salts of alkaryl sulfonic acids, which have been obtained as by-products during the sulfonation of petroleum stocks in the manufacture of refined paraffinic oils may be used in this process. Alternatively, these additives may be synthesized directly by the alkylation of benzene and subsequent sulfonation of the resulting alkyl benzene. We prefer to use compounds prepared synthetically by monosulfonation of the products resulting from dialkylation of benzene with $C_{12}$-olefins.

Though the use of such additives is not critical to the successful practice of the basic process as disclosed in the earlier application, their inclusion in the plastisol makes possible a consistently finer sponge product having more uniform cell structure and lower density. Furthermore, the additives affect the blowing process in a manner permitting a much wider choice of compounding ingredients.

The invention will be better understood from a consideration of the following examples, in which all parts are by weight:

Example 1

A plastisol was prepared by mixing together the following ingredients:

| | Parts |
|---|---|
| "Geon 121"[1] | 100 |
| "Ohopex Q-10"[2] | 102 |
| Methyl pentachlorostearate | 48 |
| Dibasic lead phosphite | 5 |
| N,N'-dinitroso, N,N'-dimethyl terephthalamide | 8.4 |
| "Primol-D"[3] | 3.6 |

[1] Dispersion-grade polyvinyl chloride manufactured by the B. F. Goodrich Chemical Co.
[2] Octyl fatty-phthalic acid esters, manufactured by Ohio-Apex Inc.
[3] A white paraffinic hydrocarbon oil, manufactured by Esso Standard Oil Company.

The plastisol was poured into an aluminum pan having an inner diameter of 3½ inches, a depth of 2 inches, and a wall thickness of 0.03 inch. The plastisol was poured into the pan to a depth of ⅛ inch, then heated in an oven having an air temperature of 100° C. until foaming was complete, as indicated by a change in color of the plastisol from yellow to white. The plastisol was then further heated in an oven having an air temperature of 160° C. for 45 minutes.

The product was a white sponge, free from objectionable odor. It had an open (sometimes called "continuous") cell structure; a density of 8.3 lbs. per cubic foot; a volume 10½ times that of the original plastisol; and a rough uneven surface.

Example 2

The procedure of Example 1 was repeated except that 3.5 parts of barium petroleum sulfonate (a mixture of barium di-o-dodecyl benzene monosulfonate and barium di-p-dodecyl benzene monosulfonate (30% active ingredient having mol. wt. 991 A.S.T.M. base No. <0.5), manufactured by Bryton Chemical Co. was added to the plastisol. The product was a white sponge, free from objectionable odor. It had a medium-fine, open cell structure, a density of 6.7 lbs. per cubic foot, and a volume 12¾ times that of the original plastisol.

Example 3

A plastisol was prepared by mixing together the following ingredients:

| | Parts |
|---|---|
| "Geon 121"[1] | 100 |
| "Monoplex S-71"[2] | 36 |
| "Ohopex Q-10"[3] | 32 |
| Methyl pentachlorostearate | 32 |
| Dibasic lead phosphite | 5 |
| Barium petroleum sulfonate[4] | 3.6 |
| N,N'-dinitroso, N,N'-dimethyl terephthalamide | 7 |
| "Primol-D"[5] | 3 |

[1] Dispersion-grade polyvinyl chloride manufactured by the B. F. Goodrich Chemical Co.
[2] A monomeric epoxy fatty acid ester, manufactured by Rohm & Haas Co.
[3] Octyl fatty-phthalic acid esters, manufactured by Ohio-Apex Inc.
[4] A mixture of barium di-o-dodecyl benzene monosulfonate and barium di-p-dodecyl benzene monosulfonate (30% active ingredient having mol. wt. 991, A.S.T.M. base No. <0.5), manufactured by Bryton Chemical Co.
[5] A white paraffinic hydrocarbon oil, manufactured by Esso Standard Oil Company.

The plastisol was treated in exactly the same manner as that of Example 1. The product was a white sponge, free from objectionable odor. It had a fine, uniform open-cell structure, a density of 7.25 lbs. per cubic foot, and a volume 11.75 times that of the original plastisol.

*Example 4*

The procedure of Example 3 was repeated except that the barium petroleum sulfonate was omitted from the plastisol. The product was a rough white sponge, free from objectionable odor. It had a very coarse, uneven cell structure and a volume of 8 times that of the original plastisol.

*Example 5*

A plastisol was prepared by mixing together the following ingredients:

| | Parts |
|---|---|
| "Geon 121" [1] | 100 |
| "Paraplex G-60" [2] | 44 |
| "Chlorowax 40" [3] | 40 |
| Di-2-ethylhexyl phthalate | 40 |
| Dibasic lead phosphite | 10 |
| N,N'-dinitroso, N,N'-dimethyl terephthalamide | 8.4 |
| Barium petroleum sulfonate [4] | 2.4 |

[1] Dispersion-grade polyvinyl chloride manufactured by the B. F. Goodrich Chemical Co.
[2] An epoxy polyester (average mol. wt. 1000, specific gravity (25° C./15° C.) 0.990, viscosity (100%, 25° C.) 2-3 poises, refractive index ($N_D 25°$) 1.472, freezing point 0–5° C.), manufactured by Rohm & Haas Co. in accordance with U.S. Patent No. 2,485,160, issued October 18, 1949.
[3] Chlorinated paraffin containing 40% combined chlorine by weight, manufactured by Diamond Alkali Co.
[4] A mixture of barium di-o-dodecyl benzene monosulfonate and barium di-p-dodecyl benzene monosulfonate (30% active ingredient having mol. wt. 991, A.S.T.M. base No.<0.5), manufactured by Bryton Chemical Co.

The plastisol was treated in exactly the same manner as that of Example 1. The product was a white sponge, free from objectionable odor. It had a density of 7 lbs. per cubic foot and a volume 12 times that of the original plastisol.

*Example 6*

The procedure of Example 5 was repeated except that the barium petroleum sulfonate was omitted from the plastisol. The product was a white sponge, free from objectionable odor. It was badly collapsed and had a very course and uneven cell structure. Expansion was very slight.

*Example 7*

A plastisol was prepared by mixing together the following ingredients:

| | Parts |
|---|---|
| "Geon 121" [1] | 100 |
| "Paraplex G-60" [2] | 50 |
| "Ohopex Q-10" [3] | 50 |
| Dibasic lead phosphite | 5 |
| Barium petroleum sulfonate [4] | 3.6 |
| N,N'-dinitroso, N,N'-dimethyl terephthalamide | 9.8 |
| "Primol-D" [5] | 4.2 |

[1] Dispersion-grade polyvinyl chloride manufactured by the B. F. Goodrich Chemical Co.
[2] An epoxy polyester (average mol. wt. 1000, specific gravity (25° C./15° C.) 0.990, viscosity (100%, 25° C.) 2-3 poises, refractive index ($N_D 25°$) 1.472, freezing point 0–5° C.), manufactured by Rohm & Haas Co. in accordance with U.S. Patent No. 2,485,160, issued October 18, 1949.
[3] Octyl fatty-phthalic acid esters, manufactured by Ohio-Apex Inc.
[4] A mixture of barium di-o-dodecyl benzene monosulfonate and barium di-p-dodecyl benzene monosulfonate (30% active ingredient having mol. wt. 991, A.S.T.M. base No.<0.5), manufactured by Bryton Chemical Co.
[5] A white paraffinic hydrocarbon oil, manufactured by Esso Standard Oil Company.

The plastisol was treated in exactly the same manner as that of Example 1. The product was a white sponge, free from objectionable odor. It had a medium-fine, open cell structure, a density of 5.9 lbs. per cubic foot and a volume 14.5 times that of the original plastisol.

*Example 8*

A plastisol was prepared by mixing together the following ingredients:

| | Parts |
|---|---|
| "Geon 121" [1] | 100 |
| "Paraplex G-60" [2] | 50 |
| Di-2-ethyhexyl phthalate | 50 |
| Dibasic lead phosphite | 5 |
| Barium petroleum sulfonate [3] | 3.6 |
| N,N'-dinitroso, N,N'-dimethyl terephthalamide | 7 |
| "Primol-D" [4] | 3 |

[1] Dispersion-grade polyvinyl chloride manufactured by the B. F. Goodrich Chemical Co.
[2] An epoxy polyester (average mol. wt. 1000, specific gravity (25° C./15° C.) 0.990, viscosity (100%, 25° C.) 2-3 poises, refractive index ($N_D 25°$) 1.472, freezing point 0–5° C.), manufactured by Rohm & Haas Co. in accordance with U.S. Patent No. 2,485,160, issued October 18, 1949.
[3] A mixture of barium di-o-dodecyl benzene monosulfonate and barium di-p-dodecyl benzene monosulfonate (30% active ingredient having mol. wt. 991, A.S.T.M. base No.<0.5), manufactured by Bryton Chemical Co.
[4] A white paraffinic hydrocarbon oil, manufactured by Esso Standard Oil Company.

The plastisol was treated in exactly the same manner as that of Example 1. The product was a white sponge, free from objectionable odor. It had a very fine open cell structure, a density of 7.5 lbs. per cubic foot, and a volume 11.5 times that of the original plastisol.

*Example 9*

A plastisol was prepared by mixing together the following ingredients:

| | Parts |
|---|---|
| "Geon 121" [1] | 100 |
| "Paraplex G-60" [2] | 50 |
| "Ohopex Q-10" [3] | 26 |
| "HB-20" [4] | 24 |
| Dibasic lead phosphite | 5 |
| Barium petroleum sulfonate [5] | 3.6 |
| N,N'-dinitroso, N,N'-dimethyl terephthalamide | 7 |
| "Primo-D" [6] | 3 |

[1] Dispersion-grade polyvinyl chloride manufactured by the B. F. Goodrich Chemical Co.
[2] An epoxy polyester (average mol. wt. 1000, specific gravity (25° C./15° C.) 0.990, viscosity (100%, 25° C.) 2-3 poises, refractive index ($N_D 25°$) 1.472, freezing point 0–5° C.), manufactured by Rohm & Haas Co. in accordance with U.S. Patent No. 2,485,160, issued October 18, 1949.
[3] Octyl fatty-phthalic acid esters, manufactured by Ohio-Apex Inc.
[4] A partially hydrogenated, alkylated aromatic hydrocarbon oil, manufactured by Monsanto Chemical Co.
[5] A mixture of barium di-o-dodecyl benzene monosulfonate and barium di-p-dodecyl benzene monosulfonate (30% active ingredient having mol. wt. 991, A.S.T.M. base No.<0.5), manufactured by Bryton Chemical Co.
[6] A white paraffinic hydrocarbon oil, manufactured by Esso Standard Oil Company.

The plastisol was treated in exactly the same manner as that of Example 1. The product was a white sponge, free from objectionable odor. It had an open cell structure, a density of 7 lbs. per cubic foot, and a volume 12 times that of the original plastisol.

*Example 10*

A plastisol was prepared by mixing together the following ingredients:

| | Parts |
|---|---|
| "Geon 121" [1] | 100 |
| "Paraplex G-62" [2] | 64 |
| 2-ethylhexyl diphenyl phosphate | 28 |
| "Chlorowax 40" [3] | 16 |
| Di-2-ethylhexyl phthalate | 16 |
| Witco stabilizer #90 [4] | 1 |
| Barium petroleum sulfonate [5] | 3.6 |
| N,N'-dinitroso, N,N'-dimethyl terephthalamide | 7 |
| "Primol-D" [6] | 3 |

[1] Dispersion-grade polyvinyl chloride manufactured by the B. F. Goodrich Chemical Co.
[2] An epoxy polyester (average mol. wt. approx. 1000, specific gravity (25° C./15° C.) 0.993, freezing point 0–5° C.), manufactured by Rohm & Haas Co.
[3] Chlorinated paraffin containing 40% combined chlorine by weight, manufactured by Diamond Alkali Co.
[4] A mixture of non-toxic soaps, manufactured by Witco Chemical Co.
[5] A mixture of barium di-o-dodecyl benzene monosulfonate and barium di-p-dodecyl benzene monosulfonate (30% active ingredient having mol. wt. 991, A.S.T.M. base No.<0.5), manufactured by Bryton Chemical Co.
[6] A white paraffinic hydrocarbon oil, manufactured by Esso Standard Oil Company.

The plastisol was treated in exactly the same manner as that of Example 1. The product was a white, exceedingly soft sponge, free from objectionable odor, and having good flame resistance. It had a fine, open cell structure, a density of 8.4 lbs. per cubic foot, and a volume 10.5 times that of the original plastisol.

*Example 11*

A plastisol was prepared by mixing together the following ingredients:

| | Parts |
|---|---|
| "Exon 654" [1] | 100 |
| "Paraplex G–62" [2] | 64 |
| 2-ethylhexyl diphenyl phosphate | 28 |
| "Chlorowax 40" [3] | 16 |
| Di-2-ethylhexyl phthalate | 16 |
| Witco stabilizer #90 [4] | 1 |
| Barium petroleum sulfonate [5] | 3.6 |
| N,N'-dinitroso, N,N'-dimethyl terephthalamide | 7 |
| "Primol–D" [6] | 3 |

[1] Dispersion-grade polyvinyl chloride, manufactured by Firestone Plastics Co.
[2] An epoxy polyester (average mol. wt. approx. 1000, specific gravity (25° C./15° C.) 0.993, freezing point 0–5° C.), manufactured by Rohm & Haas Co.
[3] Chlorinated paraffin containing 40% combined chlorine by weight, manufactured by Diamond Alkali Co.
[4] A mixture of non-toxic soaps, manufactured by Witco Chemical Co.
[5] A mixture of barium di-o-dodecyl benzene monosulfonate and barium di-p-dodecyl benzene monosulfonate (30% active ingredient having mol. wt. 991, A.S.T.M. base No. <0.5), manufactured by Bryton Chemical Co.
[6] A white paraffinic hydrocarbon oil, manufactured by Esso Standard Oil Company.

The plastisol was treated in exactly the same manner as that of Example 1. The product was a white sponge, free from objectionable odor. It had an open cell structure, a density of 9.6 lbs. per cubic foot, and a volume 9.3 times that of the original plastisol.

*Example 12*

A plastisol was prepared by mixing together the following ingredients:

| | Parts |
|---|---|
| "Geon 121" [1] | 100 |
| "Paraplex G–60" [2] | 50 |
| "Ohopex Q–10" [3] | 26 |
| Methyl pentachlorostearate | 24 |
| Dibasic lead phosphite | 5 |
| Calcium petroleum sulfonate [4] | 3.6 |
| N,N'-dinitroso, N,N'-dimethyl terephthalamide | 7 |
| "Primol–D" [5] | 3 |

[1] Dispersion-grade polyvinyl chloride manufactured by the B. F. Goodrich Chemical Co.
[2] An epoxy polyester (average mol. wt. 1000, specific gravity (25° C./15° C.) 0.990, viscosity (100%, 25° C.) 2–3 poises, refractive index (N$_D$25°) 1.472, freezing point 0–5° C.), manufactured by Rohm & Haas Co. in accordance with U.S. Patent No. 2,485,160, issued October 18, 1949.
[3] Octyl fatty-phthalic acid esters, manufactured by Ohio-Apex Inc.
[4] A mixture of calcium di-o-decyl benzene monosulfonate and calcium di-p-dodecyl benzene monosulfonate (30% active ingredient having mol. wt. 884) manufactured by Bryton Chemical Co.
[5] A white paraffinic hydrocarbon oil, manufactured by Esso Standard Oil Company.

The plastisol was treated in exactly the same manner as that of Example 1. The product was a white, exceedingly soft, highly resilient sponge, free from objectionable odor. It had a very fine, open cell structure, a density of 7.5 lbs. per cubic foot, and a volume 11.5 times that of the original plastisol.

*Example 13*

A plastisol was prepared by mixing together the following ingredients:

| | Parts |
|---|---|
| "Geon 121" [1] | 25 |
| "Glyptal 2557" [2] | 12.5 |
| "Paraplex G–60" [3] | 10 |
| Basic lead carbonate | 5 |
| Barium ricinoleate | 0.5 |
| Sodium petroleum sulfonate [4] | 1.2 |
| N,N'-dinitroso, N,N'-dimethyl terephthalamide | 7 |
| "Primol–D" [5] | 3 |

[1] Dispersion-grade polyvinyl chloride manufactured by the B. F. Goodrich Chemical Co.
[2] A polyadipate (specific gravity (25° C./15° C.) 1.02, viscosity (100%, 25° C.) 2.75–3.25 poises), manufactured by the General Electric Co.
[3] An epoxy polyester (average mol. wt. 1000, specific gravity (25° C./15° C.) 0.990, viscosity (100%, 25° C.) 2–3 poises, refractive index (N$_D$25°) 1.472, freezing point 0–5° C.), manufactured by Rohm & Haas Co. in accordance with U.S. Patent No. 2,485,160, issued October 18, 1949.
[4] A mixture of neutral sodium di-o-dodecyl benzene monosulfonate and sodium di-p-dodecyl benzene monosulfonate (62% active ingredient having mol. wt. 490), manufactured by Bryton Chemical Co.
[5] A white paraffinic hydrocarbon oil, manufactured by Esso Standard Oil Company.

The plastisol was treated in exactly the same manner as that of Example 1. The product was a white sponge, free from objectionable odor. It had a very fine, open cell structure and a volume 14 times that of the original plastisol.

*Example 14*

The procedure of Example 13 was repeated except that the sodium petroleum sulfonate was omitted from the plastisol. The product was a white sponge, free from objectionable odor and having a medium-fine cell structure and a volume 16 times that of the original plastisol. This sponge had a fissure through its center.

*Example 15*

A plastisol was prepared by mixing together the following ingredients:

| | Parts |
|---|---|
| "Geon 121" [1] | 100 |
| "Paraplex G–60" [2] | 36 |
| "Ohopex Q–10" [3] | 32 |
| Methyl pentachlorostearate | 32 |
| Dibasic lead phosphite | 5 |
| "Barium petronate" [4] | 1.8 |
| N,N'-dinitroso, N,N'-dimethyl terephthalamide | 7 |
| "Primol–D" [5] | 3 |

[1] Dispersion-grade polyvinyl chloride manufactured by the B. F. Goodrich Chemical Co.
[2] An epoxy polyester (average mol. wt. 1000, specific gravity (25° C./15° C.) 0.990, viscosity (100%, 25° C.) 2–3 poises, refractive index (N$_D$25°) 1.472, freezing point 0–5° C.), manufactured by Rohm & Haas Co. in accordance with U.S. Patent No. 2,485,160, issued October 18, 1949.
[3] Octyl fatty-phthalic acid esters, manufactured by Ohio-Apex Inc.
[4] The barium salt of an alkaryl sulfonic acid, obtained as a by-product in the sulfuric acid refining of petroleum stocks (58.5% active ingredients having mol. wt. 981, A.S.T.M. base No. 0), manufactured by L. Sonneborn Sons, Inc.
[5] A white paraffinic hydrocarbon oil, manufactured by Esso Standard Oil Company.

The plastisol was treated in exactly the same manner as that of Example 1. The product was a white sponge, free from objectionable odor. It had an open cell structure and a density of 7 lbs. per cubic foot.

Example 16

A plastisol was prepared by mixing together the following ingredients:

| | Parts |
|---|---|
| "Geon 121" [1] | 100 |
| "Paraplex G-60" [2] | 36 |
| "Ohopex Q-10" [3] | 32 |
| Methyl pentachlorostearate | 32 |
| Dibasic lead phosphite | 5 |
| "Calcium petronate" [4] | 3.6 |
| N,N'-dinitroso, N,N'-dimethyl terephthalamide | 7 |
| "Primol-D" [5] | 3 |

[1] Dispersion-grade polyvinyl chloride manufactured by the B. F. Goodrich Chemical Co.
[2] An epoxy polyester (average mol. wt. 1000, specific gravity (25° C./15° C.) 0.990, viscosity (100%, 25° C.) 2-3 poises, refractive index (N$_D$25°) 1.472, freezing point 0-5° C.), manufactured by Rohm & Haas Co. in accordance with U.S. Patent No. 2,485,160, issued October 18, 1949.
[3] Octyl fatty-phthalic acid esters, manufactured by Ohio-Apex Inc.
[4] The calcium salt of an alkaryl sulfonic acid, obtained as a by-product in the sulfuric acid refining of petroleum stocks (58.5% active ingredients having mol. wt. 888, A.S.T.M. base No. 0), manufactured by L. Sonneborn Sons, Inc.
[5] A white paraffinic hydrocarbon oil, manufactured by Esso Standard Oil Company.

The plastisol was treated in exactly the same manner as that of Example 1. The product was a white sponge, free from objectionable odor. It had a fine, open cell structure, a density of 7.7 lbs. per cubic foot, and a volume 11.3 times that of the original plastisol.

Example 17

A plastisol was prepared by mixing together the following ingredients:

| | Parts |
|---|---|
| "Geon 121" [1] | 100 |
| "Paraplex G-62" [2] | 50 |
| "Paraplex G-25" [3] | 50 |
| Dibasic lead phosphite | 5 |
| "Petromix #9" [4] | 0.2 |
| N,N'-dinitroso, N,N'-dimethyl terephthalamide | 7 |
| "Primol-D" [5] | 3 |

[1] Dispersion-grade polyvinyl chloride manufactured by the B. F. Goodrich Chemical Co.
[2] An epoxy polyester (average mol. wt. approx. 1000, specific gravity (25° C./15° C.) 0.993, freezing point 0-5° C.), manufactured by Rohm & Haas Co.
[3] A polysebacate (average mol. wt. 8000, specific gravity (25° C./15° C.) 0.993, freezing point 0-5° C.) manufactured by Rohm & Haas Co.
[3] A polysebacate (average mol. wt. 8000, specific gravity (25° C./15° C.) 1.06, viscosity (100%, 25° C.) 1700 poises, refractive index (N$_D$25°) 1.470, freezing point 13-15° C.).
[4] An oil-base composition containing petroleum sulfonates fortified with auxiliary soaps, manufactured by L. Sonneborn Sons, Inc.
[5] A white paraffinic hydrocarbon oil, manufactured by Esso Standard Oil Company.

The plastisol was poured into an aluminum pan 20 inches square, 2 inches deep, and having a wall thickness of ¼ inch. The plastisol was poured into the pan to a depth of ⅛ inch, then heated for 1¼ hours in a circulating-air oven having an air temperature of 177° C. It was noted that the blowing agent had completely decomposed and foaming was complete within 10 minutes after the plastisol was placed in the oven. Temperature measurements in the plastisol indicated that foaming began at 60° C. and was complete at 125° C.

The product was a white sponge, free from objectionable odor. It had a fine, open cell structure, a density of 7 lbs. per cubic inch, and a volume 11.5 times that of the original plastisol.

The above examples illustrate the application of our novel process to the preparation of cellular compositions having an open or continuous cell structure.

We have also found that the addition of the additives described above makes possible the preparation at atmospheric pressure of cellular polyvinyl chloride having a very high proportion of closed cells, which are very fine in size and not very easily ruptured in usage. The prior art suggests the preparation of sponge having a high proportion of closed cells in the same formulations using substantial amounts of fatty acid soaps, such as calcium stearate, but the closed cells so obtained are coarse and relatively easily ruptured. The advantages of the additives of our invention in this connection are illustrated by the following examples:

Example 18

A plastisol was prepared by mixing together the following ingredients:

| | Parts |
|---|---|
| "Bakelite QYNV" [1] | 100 |
| "Paraplex G-53" [2] | 50 |
| "Paraplex G-62" [3] | 50 |
| Dibasic lead phosphite | 5 |
| Barium petroleum sulfonate [4] | 3.6 |
| N,N'-dinitroso, N,N'-dimethyl terephthalamide | 7 |
| "Primol-D" [5] | 3 |

[1] Dispersion-grade polyvinyl chloride, manufactured by the Bakelite Co.
[2] A polyadipate (specific gravity (25° C./15° C.) 1.1015, freezing point approx. 10° C.) manufactured by Rohm and Haas Co.
[3] An epoxy polyester (average mol. wt. approx. 1000, specific gravity (25° C./15° C.) 0.993, freezing point 0-5° C.), manufactured by Rohm and Haas Co.
[4] A mixture of barium di-o-dodecyl benzene monosulfonate and barium di-p-dodecyl benzene monosulfonate (30% active ingredient having mol. wt. 991, A.S.T.M. base No. <0.5), manufactured by Bryton Chemical Co.
[5] A white paraffinic hydrocarbon oil, manufactured by Esso Standard Oil Company.

The plastisol was treated in exactly the same manner as that of Example 1. The product was a white sponge, having no objectionable odor. It had a fine, uniform cell structure, a density of 8.6 lbs. per cubic foot, and a volume 10 times that of the original plastisol. This sponge contained a high proportion of closed cells as shown by the following test: The sponge was submerged in a pan of water within a bell jar. The jar was evacuated. The sponge swelled to several times its original volume. The system was then allowed to return to atmospheric pressure and the sponge returned to its original dimensions. Further examination of the sponge showed that it had absorbed only about 15% of its weight of water. A sponge known to have an open cell structure absorbed over 500% of its weight of water when put through a similar procedure.

Example 19

The procedure of Example 18 was repeated except that the barium petroleum sulfonate was obitted from the plastisol. The product was a white sponge, free from objectionable odor. It had a medium-fine, open cell structure, a density of 7.5 lbs. per cubic foot, and a volume 11.5 times that of the original plastisol. This sponge was submitted to the water immersion test described in Example 18. It did not expand on evacuation of the bell jar, and it was found to have absorbed over 500% of its weight of water in the fashion of the sponge known to be of the open cell variety.

Example 20

A plastisol was prepared by mixing together the following ingredients:

| | Parts |
|---|---|
| "Exon 654" [1] | 100 |
| "Paraplex G-60" [2] | 44 |
| "Ohopex Q-10" [3] | 40 |
| Methyl pentachlorostearate | 40 |
| Dibasic lead phosphite | 5 |
| Barium petroleum sulfonate [4] | 3.6 |
| N,N'-dinitroso, N,N'-dimethyl terephthalamide | 7 |
| "Primol-D" [5] | 3 |

[1] Dispersion-grade polyvinyl chloride, manufactured by Firestone Plastics Co.
[2] An epoxy polyester (average mol. wt. 1000, specific gravity (25° C./15° C.) 0.990, viscosity (100%, 25° C.) 2-3 poises, refractive index (N$_D$25°) 1.472, freezing point 0-5° C.), manufactured by Rohm & Haas Co. in accordance with U.S. Patent No. 2,485,160, issued October 18, 1949.
[3] Octyl fatty-phthalic acid esters, manufactured by Ohio-Apex Inc.
[4] A mixture of barium di-o-dodecyl benzene monosulfonate and barium di-p-dodecyl benzene monosulfonate (30% active ingredient having mol. wt. 991 A.S.T.M. base No. <0.5), manufactured by Bryton Chemical Co.
[5] A white paraffinic hydrocarbon oil, manufactured by Esso Standard Oil Company.

The plastisol was treated in exactly the same manner as that of Example 1. The product was a white sponge, free from objectionable odor. It had a very fine cell structure, a density of 10.6 lbs. per cubic foot and a volume 8⅓ times that of the original plastisol. This sponge was predominantly closed-cell as indicated by its behavior on being subjected to the water immersion test described in Example 18.

From the foregoing examples it is evident that additives of the type disclosed are effective with a wide variety of plasticizers. Thus, for instance, several of the above examples illustrate the use of monomeric-type plasticizers. Several others illustrate the use of polyester-type plasticizers, while still others employ a mixture of the two types. Regardless of the type of plasticizer used, the addition of an additive of the type disclosed greatly enhances the product.

Though the invention is applicable to the preparation of expanded cellular polyvinyl chloride compositions with any of a variety of blowing agents, the addition of these additives to the plastisol before blowing is particularly effective when the blowing agent employed is N,N'-dinitroso, N,N'-dimethyl terephthalamide and kindred compounds such as N,N'-dinitroso, N,N'-dimethyl isophthalamide and N,N'-dinitroso, N,N'-diethyl terephthalamide. A preferred process for the preparation of these compounds may be found in the pending U.S. patent application Serial No. 316,076, filed October 21, 1952, now U.S. Patent No. 2,754,326, issued July 10, 1956, and having a common assignee with the instant application.

The additive of the present invention may be used in amounts of about 0.5%, as in Example 15, to about 1.5%, as in Example 13, based on the weight of the resin. Good results have been obtained with about 1% of the additive based on the weight of the resin, as illustrated in Examples 2, 3, 7 through 12, 16, 18, and 20, and this represents the preferred operating proportion.

Having thus described and illustrated our invention, we intend to be limited only by the following claims:

1. A process for the preparation of an expanded cellular composition which includes the essential steps of forming a plastisol by mixing suitable portions of a dispersion-grade polyvinyl chloride, a plasticizer, from about 0.5% to about 1.5%, based on the weight of the polyvinyl chloride, of an additive selected from the class consisting of the hydrocarbon oil-soluble alkali metal and alkaline earth metal salts of alkaryl sulfonic acids, and N,N'-dinitroso, N,N'-dimethyl terephthalamide as a chemical blowing agent, heating said plastisol to about the temperature of decomposition of the blowing agent, and thereafter heating said plastisol to a higher temperature to accomplish the gelation of the plastisol after the blowing agent has decomposed and foamed same.

2. The process of claim 1 wherein the additive is a hydrocarbon oil-soluble alkaline earth metal salt of an alkaryl sulfonic acid.

3. The process of claim 1 wherein the additive comprises a mixture of the alkaline earth metal salts of di-o-dodecyl benzene sulfonic acid and di-p-dodecyl benzene mono-sulfonic acid.

4. The process of claim 2 wherein the alkaline earth metal salt is a barium salt of an alkaryl sulfonic acid.

5. The process of claim 2 wherein the alkaline earth metal salt is a calcium salt of an alkaryl sulfonic acid.

6. A plastisol composition for use in the preparation of expanded cellular compositions comprising a mixture of a dispersion-grade polyvinyl chloride, a plasticizer, from about 0.5% to about 1.5%, based on the weight of the polyvinyl chloride, of an additive selected from the class consisting of the hydrocarbon oil-soluble alkali metal and alkaline earth metal salts of alkaryl sulfonic acids, and N,N'-dinitroso, N,N'-dimethyl terephthalamide as a chemical blowing agent.

7. A plastisol composition for use in the preparation of expanded cellular compositions comprising a mixture of a dispersion-grade polyvinyl chloride, a plasticizer, from about 0.5% to about 1.5%, based on the weight of the polyvinyl chloride, of a hydrocarbon oil-soluble alkali metal salt of an alkaryl sulfonic acid, and N,N'-dinitroso, N,N'-dimethyl terephthalamide as a chemical blowing agent.

8. A plastisol composition for use in the preparation of expanded cellular compositions comprising a mixture of a dispersion-grade polyvinyl chloride, a plasticizer, from about 0.5% to about 1.5%, based on the weight of the polyvinyl chloride, of a hydrocarbon oil-soluble alkaline earth metal salt of an alkaryl sulfonic acid, and N,N'-dinitroso, N,N'-dimethyl terephthalamide as a chemical blowing agent.

References Cited in the file of this patent

UNITED STATES PATENTS

| | | |
|---|---|---|
| 2,433,849 | Lathrop et al. | Jan. 6, 1948 |
| 2,466,826 | Romaine | Apr. 12, 1949 |
| 2,525,966 | Smith et al. | Oct. 17, 1950 |
| 2,609,347 | Wilson | Sept. 2, 1952 |
| 2,676,928 | Frank | Apr. 27, 1954 |
| 2,732,353 | Fuller | Jan. 24, 1956 |

UNITED STATES PATENT OFFICE

CERTIFICATE OF CORRECTION

Patent No. 2,904,522 September 15, 1959

Willard E. Catlin et al

It is hereby certified that error appears in the printed specification of the above numbered patent requiring correction and that the said Letters Patent should read as corrected below.

Column 2, line 34, following "Bryton Chemical Co." insert a closing parenthesis; column 5, line 64, for "di-o-decyl" read -- di-o-dodecyl --; column 6, line 19, for "2An epoxy" read -- 3An epoxy --; column 7, lines 42 and 43, strike out the entire 3-line footnote; column 8, line 43, for "obitted" read -- omitted --.

Signed and sealed this 29th day of March 1960.

(SEAL)
Attest:

KARL H. AXLINE
Attesting Officer

ROBERT C. WATSON
Commissioner of Patents